United States Patent
Sarraf et al.

(10) Patent No.: US 10,025,976 B1
(45) Date of Patent: Jul. 17, 2018

(54) DATA NORMALIZATION FOR HANDWRITING RECOGNITION

(71) Applicant: KONICA MINOLTA LABORATORY U.S.A., INC., San Mateo, CA (US)

(72) Inventors: Saman Sarraf, San Carlos, CA (US); Duanduan Yang, San Jose, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 0 days.

(21) Appl. No.: 15/393,056

(22) Filed: Dec. 28, 2016

(51) Int. Cl.
| | |
|---|---|
| *G06K 9/00* | (2006.01) |
| *G06K 9/62* | (2006.01) |
| *G06T 5/00* | (2006.01) |
| *G06T 5/20* | (2006.01) |
| *G06K 9/42* | (2006.01) |
| *G06K 9/46* | (2006.01) |

(52) U.S. Cl.
CPC ........... *G06K 9/00409* (2013.01); *G06K 9/42* (2013.01); *G06K 9/4642* (2013.01); *G06K 9/6256* (2013.01); *G06K 9/6262* (2013.01); *G06T 5/002* (2013.01); *G06T 5/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,028,956 | A * | 2/2000 | Shustorovich | G06K 9/3233 382/156 |
| 6,038,531 | A * | 3/2000 | Miyazawa | G10L 15/16 704/232 |
| 2002/0126905 | A1* | 9/2002 | Suzuki | G06K 9/6835 382/229 |
| 2008/0285804 | A1* | 11/2008 | Sefton | G06K 9/00771 382/105 |

* cited by examiner

*Primary Examiner* — Alex Liew
(74) *Attorney, Agent, or Firm* — Chen Yoshimura LLP

(57) ABSTRACT

Disclosed herein is a method of optimizing data normalization by selecting the best height normalization setting from training RNN (Recurrent Neural Network) with one or more datasets comprising multiple sample images of handwriting data, which comprises estimating a few top place ratios for normalization by minimizing a cost function for any given sample image in the training dataset, and further, determining the best ratio from the top place ratios by validating the recognition results of sample images with each top place ratio.

27 Claims, 15 Drawing Sheets

| image | GT |
|---|---|
| the | the |
| but | but |
| hall | hall |
| plus | plus |
| lock | lock |
| hill | hill |
| moon | moon |
| seed | seed |
| copy | copy |
| allow | allow |
| around | around |
| parent | parent |
| offer | offer |
| although | although |
| administration | administration |
| population | population |
| evidence | evidence |
| daughter | daughter |
| performance | performance |
| wrong | wrong |
| point | point |
| daughter | daughter |
| operation | operation |
| knowledge | knowledge |
| station | station |

Fig. 11A

| image | GT | Squared Error | | | |
|---|---|---|---|---|---|
| | | ratio[1] | ratio[2] | ... | ratio[n] |
| *the* | the | Error₁₁ | Error₂₁ | ... | Errorₙ₁ |
| *but* | but | Error₁₂ | Error₂₂ | ... | Errorₙ₂ |
| *hall* | hall | Error₁₃ | Error₂₃ | ... | Errorₙ₃ |
| *plus* | plus | Error₁₄ | Error₂₄ | ... | Errorₙ₄ |
| *lock* | lock | Error₁₅ | Error₂₅ | ... | Errorₙ₅ |
| *hill* | hill | Error₁₆ | Error₂₆ | ... | Errorₙ₆ |
| *moon* | moon | Error₁₇ | Error₂₇ | ... | Errorₙ₇ |
| *seed* | seed | Error₁₈ | Error₂₈ | ... | Errorₙ₈ |
| *copy* | copy | Error₁₉ | Error₂₉ | ... | Errorₙ₉ |
| *allow* | allow | Error₁₁₀ | Error₂₁₀ | ... | Errorₙ₁₀ |
| *around* | around | Error₁₁₁ | Error₂₁₁ | ... | Errorₙ₁₁ |
| *parent* | parent | Error₁₁₂ | Error₂₁₂ | ... | Errorₙ₁₂ |
| *offer* | offer | Error₁₁₃ | Error₂₁₃ | ... | Errorₙ₁₃ |
| *although* | although | Error₁₁₄ | Error₂₁₄ | ... | Errorₙ₁₄ |
| *administration* | administration | Error₁₁₅ | Error₂₁₅ | ... | Errorₙ₁₅ |
| *population* | population | Error₁₁₆ | Error₂₁₆ | ... | Errorₙ₁₆ |
| *evidence* | evidence | Error₁₁₇ | Error₂₁₇ | ... | Errorₙ₁₇ |
| *daughter* | daughter | Error₁₁₈ | Error₂₁₈ | ... | Errorₙ₁₈ |
| *performance* | performance | Error₁₁₉ | Error₂₁₉ | ... | Errorₙ₁₉ |
| *wrong* | wrong | Error₁₂₀ | Error₂₂₀ | ... | Errorₙ₂₀ |
| *point* | point | Error₁₂₁ | Error₂₂₁ | ... | Errorₙ₂₁ |
| *daughter* | daughter | Error₁₂₂ | Error₂₂₂ | ... | Errorₙ₂₂ |
| *operation* | operation | Error₁₂₃ | Error₂₂₃ | ... | Errorₙ₂₃ |
| *knowledge* | knowledge | Error₁₂₄ | Error₂₂₄ | ... | Errorₙ₂₄ |
| *station* | station | Error₁₂₅ | Error₂₂₅ | ... | Errorₙ₂₅ |
| | | CF[1] | CF[2] | ... | CF[n] |

Fig. 11B

| image | GT | Error (S334, 336) |
|---|---|---|
| *the* | the | Error[1] |
| *but* | but | Error[2] |
| *hall* | hall | Error[3] |
| *plus* | plus | Error[4] |
| *lock* | lock | Error[5] |
| *hill* | hill | Error[6] |
| *moon* | moon | Error[7] |
| *seed* | seed | Error[8] |
| *Copy* | copy | Error[9] |
| *allow* | allow | Error[10] |
| *around* | around | Error[11] |
| *parent* | parent | Error[12] |
| *offer* | offer | Error[13] |
| *although* | although | Error[14] |
| *administration* | administration | Error[15] |
| *population* | population | Error[16] |
| *evidence* | evidence | Error[17] |
| *daughter* | daughter | Error[18] |
| *performance* | performance | Error[19] |
| *wrong* | wrong | Error[20] |
| *point* | point | Error[21] |
| *daughter* | daughter | Error[22] |
| *Operation* | operation | Error[23] |
| *knowledge* | knowledge | Error[24] |
| *station* | station | Error[25] |

Fig. 11C

DATA NORMALIZATION FOR HANDWRITING RECOGNITION

BACKGROUND OF THE INVENTION

Field of the Invention

This invention relates to certain machine-learning techniques for handwriting recognition, and in particular, a method of optimizing data normalization in order to improve the accuracy of handwriting recognition.

Description of Related Art

Handwriting recognition plays an important role in the field of artificial intelligence. It represents the ability of a computer to receive and interpret intelligible handwritten input from sources such as paper documents, photographs, touch-screens and other devices. Given the great variances in human handwriting styles, however, it can be very difficult for a computer to understand and recognize handwritten characters with 100% accuracy. Especially for cursive handwriting recognition, usually the accuracy rate is no more than 60% under the current state of art, which does not meet most customer requirements. Therefore, a need exists for enhancing the performance of handwriting recognition.

One of the most important steps in the process of handwriting recognition is data normalization, which is to standardize handwriting data from different input resources, such as touchscreen devices or tablets from various users. Most existing normalization methods have been developed for handwriting recognition at the level of characters rather than sentences or data sequences. As such, they are not fully applicable for handwriting recognition based on modern (deep) machine-learning techniques. For instance, under these traditional methods, normalization is usually done in a local scale (e.g., on the character level) instead of a global scale (e.g., on the level of entire sentences or paragraphs), thereby providing very little impact on the final recognition accuracy. In view of this problem, there is a need to optimize the normalization process in handwriting recognition.

SUMMARY

Accordingly, the present invention is directed to a machine learning method that improves the performance of handwriting recognition that substantially obviates one or more of the problems due to limitations and disadvantages of the related art.

An object of the present invention is to provide a method of optimizing data normalization by selecting the best height normalization setting from training RNN (Recurrent Neural Network) with one or more datasets comprising multiple sample images of handwriting data. To that end, one object of the present invention is to estimate a few top place ratios for normalization by minimizing a cost function for any given sample image in the training dataset. Another object of the present invention is to further determine the best ratio out of the top place ratios by validating the recognition results of the dataset through RNN.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method of optimizing data normalization for handwriting recognition. Specifically, the method comprises the following steps: obtaining an image comprising handwriting data corresponding to at least one word; pre-processing the obtained image to produce a pre-processed image comprising multiple pixels; normalizing a height of the pre-processed image to generate a normalized image by calculating a vertical histogram for the pre-processed image; detecting a middle height of the vertical histogram; increasing a major component height from the middle height until a pre-determined count of pixels out of the multiple pixels of the pre-processed image are covered; calculating a ratio between a pre-determined fixed height and the major component height; and zooming in or out of the pre-processed image at the calculated ratio to generate the normalized image; sending the normalized image and a normalization setting to RNN (Recurrent Neural Network); and obtaining a recognition result from the RNN for the normalized image based on the normalization setting. In another embodiment, the normalization setting is obtained by training the RNN with a dataset comprising multiple sample images of handwriting data, which comprises: determining a plurality of candidate ratios for normalization by minimizing a cost function for each sample image of the dataset, each candidate ratio representing an optimal ratio for at least one of the multiple sample images of the dataset; and selecting the best ratio from the plurality candidate ratios based on a validation of recognition results for each sample image of the dataset.

In another aspect, the present invention provides a computer program product comprising a computer usable non-transitory medium (e.g. memory or storage device) having a computer readable program code embedded therein for controlling a data processing system, the data processing system comprising a computer and one or more printers, the computer readable program code configured to cause the computer in the data processing system to execute the above method.

In yet another aspect, the present invention provides an apparatus for optimizing normalization for handwriting recognition, which comprises a processor configured for obtaining an image comprising handwriting data corresponding to at least one word; a pre-processor configured for pre-processing the obtained image to produce a pre-processed image comprising multiple pixels; and a normalizer configured for normalizing a height of the pre-processed image to generate a normalized image by: calculating a vertical histogram for the pre-processed image, detecting a middle height of the vertical histogram, increasing a major component height from the middle height until a pre-determined count of pixels out of the multiple pixels of the pre-processed image are covered, calculating a ratio between a pre-determined fixed height and the major component height, and zooming in or out of the pre-processed image at the calculated ratio to generate the normalized image; wherein the processor is further configured for sending the normalized image and a normalization setting to RNN (Recurrent Neural Network) and obtaining a recognition result from the RNN for the normalized image based on the normalization setting.

It is to be understood that both the foregoing general description and the following detailed description are exemplary and explanatory and are intended to provide further explanation of the invention as claimed.

BRIEF DESCRIPTION OF THE DRAWINGS

FIGS. 11A-C provide sample images of handwriting data for normalization according to embodiments of the present invention.

DETAILED DESCRIPTION OF PREFERRED EMBODIMENTS

Embodiments of the present invention are directed to a method of optimizing data normalization for handwriting recognition. Specifically, the method comprises the following steps: obtaining an image comprising handwriting data; pre-processing the obtained image to produce a pre-processed image comprising multiple pixels; normalizing a height of the pre-processed image to generate a normalized image; sending the normalized image and a normalization setting to RNN (Recurrent Neural Network); and obtaining a recognition result from the RNN for the normalized image based on the normalization setting.

In one embodiment, the image height is normalized by calculating a vertical histogram for the pre-processed image; detecting a middle height of the vertical histogram; increasing a major component height from the middle height until a pre-determined count of pixels out of the multiple pixels of the pre-processed image are covered; calculating a ratio between a pre-determined fixed height and the major component height; and zooming in or out of the pre-processed image at the calculated ratio to generate the normalized image.

In another embodiment, the normalization setting is obtained by training the RNN with a dataset comprising multiple sample images of handwriting data, which comprises: determining a plurality of candidate ratios for normalization by minimizing a cost function for each sample image of the dataset, each candidate ratio representing an optimal ratio for at least one of the multiple sample images of the dataset; and selecting the best ratio from the plurality candidate ratios based on a validation of recognition results for each sample image of the dataset.

Figure 1:
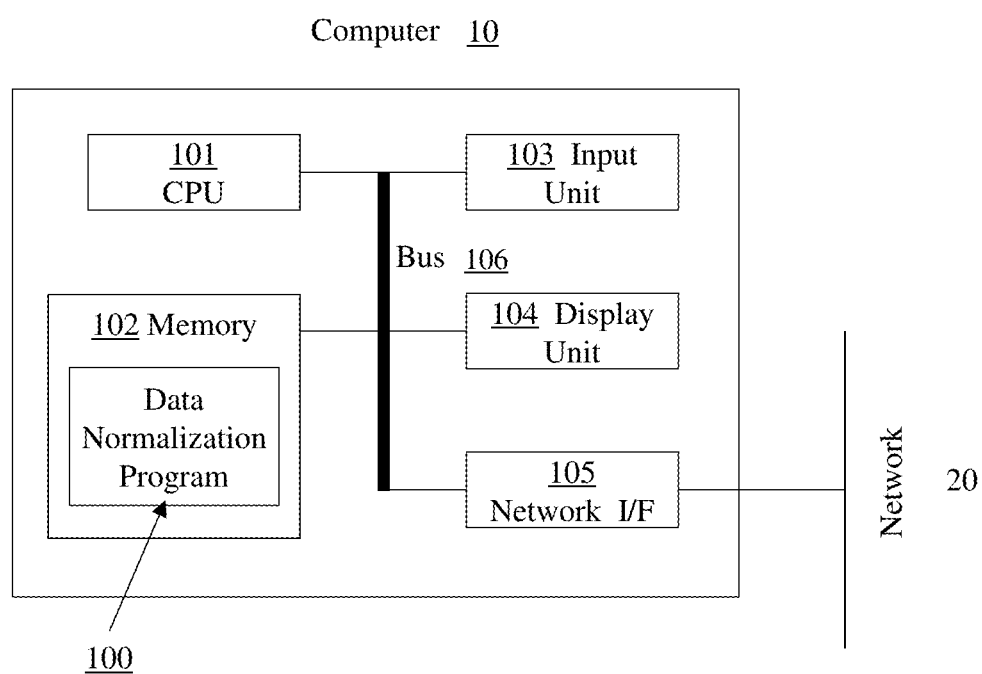
FIG. 1 is a block diagram of a computer in which embodiments of the present invention may be implemented.

Turning to FIG. 1, provided is a block diagram of an exemplary computer in which embodiments of the present invention may be implemented. As shown in FIG. 1, this computer 10 comprises a Central Processing Unit (CPU) 101, a memory 102, an input unit 103 such as a keyboard or a tablet stylus pen, a display unit 104 such as a computer monitor or touchscreen display, and a network interface 105, all these components (including those not shown) communicating with each other internally via a bus 106. Through the network interface 105, the computer 10 is connected to a network 20, such as a LAN or WAN, and communicate with other devices connected to the network.

Usually the memory 102 stores computer-executable instructions or software programs accessible to the CPU 101, which is configured to execute these software programs as needed in operation. Preferably, such software programs are designed to run on Windows OS, Macintosh OS, or Unix X Windows or other popular computer operating systems implementing a GUI (graphic user interface), such as a touchscreen and/or a mouse and a keyboard, coupled with a display monitor. In one embodiment, such software in the memory 102 includes a data normalization program 100, which, when executed by the CPU 101, enables the computer 10 to normalize handwriting data received by the computer 10. As will be described in detail herein below, the normalization program 100 is configured to optimize the data normalization process in handwriting recognition by exploring the best value for height normalization in both local and global scales. Besides, the normalization program 100 is applied in a training stage, where top place ratios for normalization are selected by minimizing a cost function for any given sample image, and further, the best ratio out of the top place ratios are determined via validating recognition results for the dataset.

In addition to the data normalization program 100, the CPU 101 is also configured to execute other types of software (e.g., administrative software), applications (e.g., network communication application), operating systems, etc.

Figure 2:
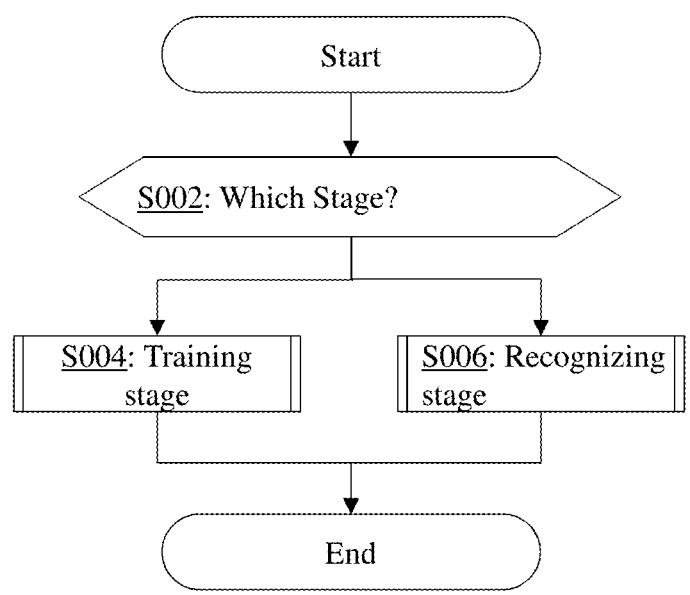
FIG. 2 is a flow chart diagram illustrating a high-level view of two stages in which the data normalization algorithm for handwriting recognition is applied according to embodiments of the present invention.

FIG. 2 is a flow chart diagram illustrating a high-level view of two stages in which the data normalization algorithm is applied according to embodiments of the present invention. As shown in FIG. 2, starting at step S002, the system or computer for implementing the handwriting recognition program, and more particularly, the data normalization program, first determines which stage to apply the program. Depending on the determination, the system or computer will proceed to execute the normalization program either in the training stage S004 or the recognizing stage S006. As will be described in detail herein below, by executing or applying the normalization program in the training stage, for example, training RNN (Recurrent Neural Network), embodiments of the invention can determine the best ratio as part of the height normalization setting to be used in handwriting recognition. Such determined setting will be used in the recognizing stage to process any handwriting image input and obtain the final recognition result.

Figure 3:
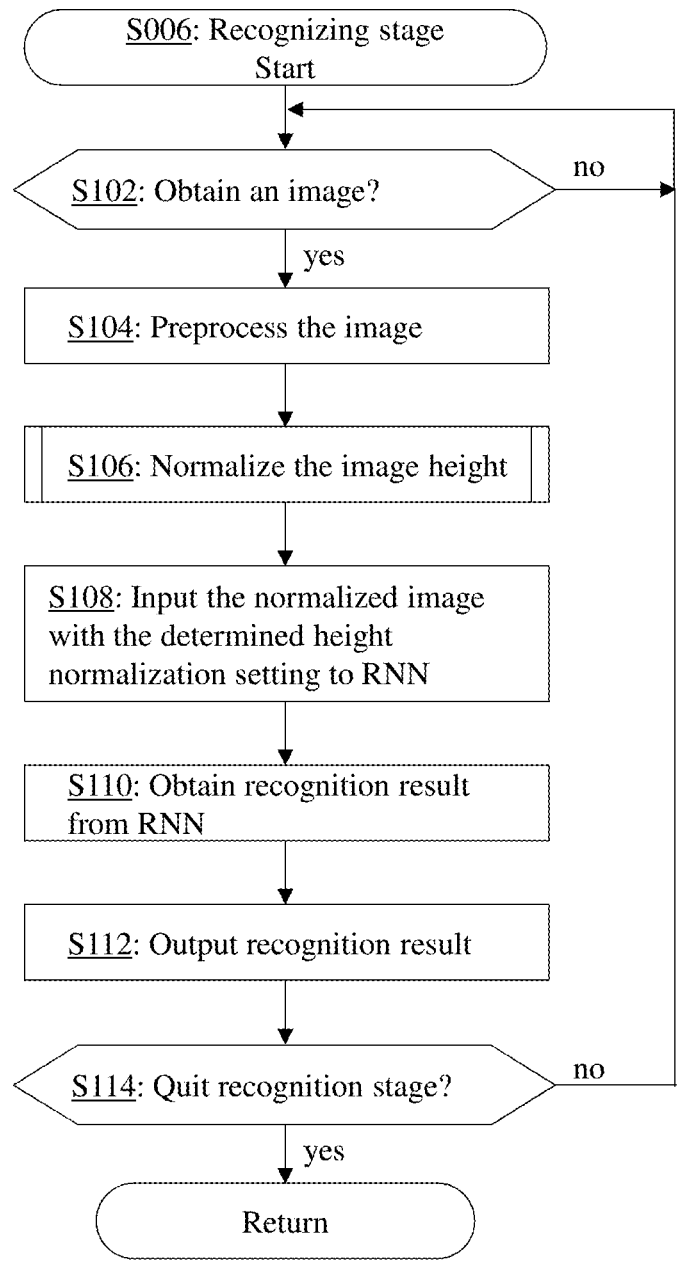
FIG. 3 is a flow chart diagram illustrating an exemplary application of the data normalization algorithm in the recognizing stage of FIG. 2 according to embodiments of the present invention.
Figure 4:
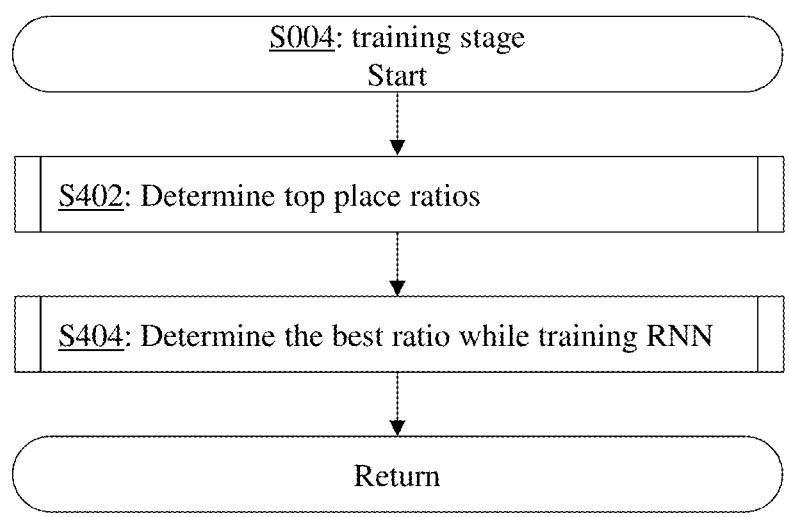
FIG. 4A is a flow chart diagram illustrating an exemplary process for normalizing the image height as part of the data normalization algorithm according to embodiments of the present invention.
FIG. 4B depicts an exemplary vertical histogram of a sample image to be normalized according to embodiments of the present invention.
Figure 4A:
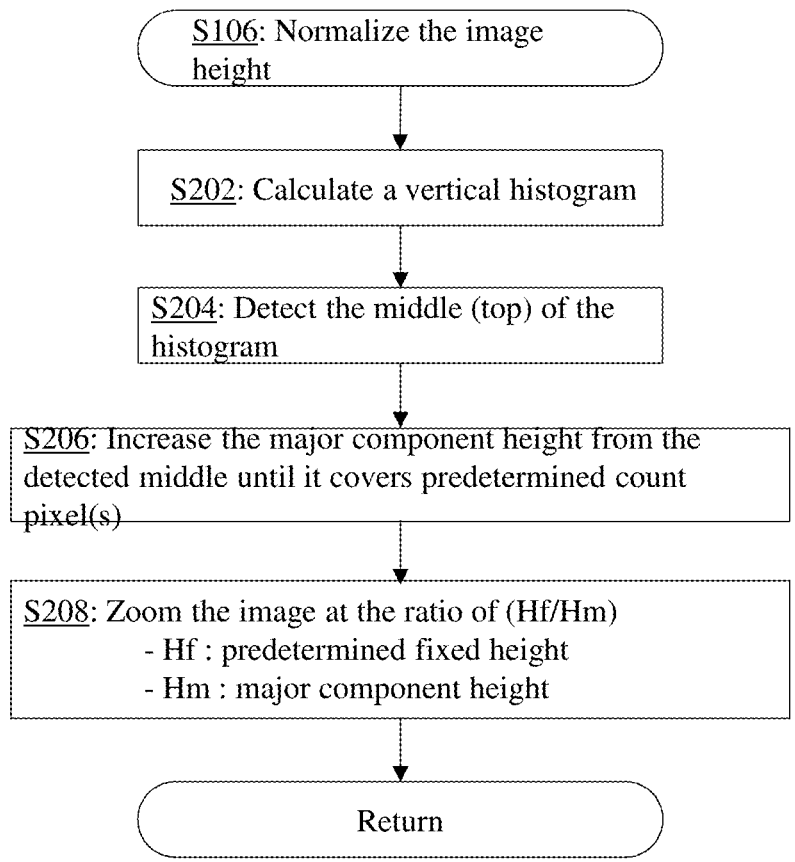
Figure 4B:
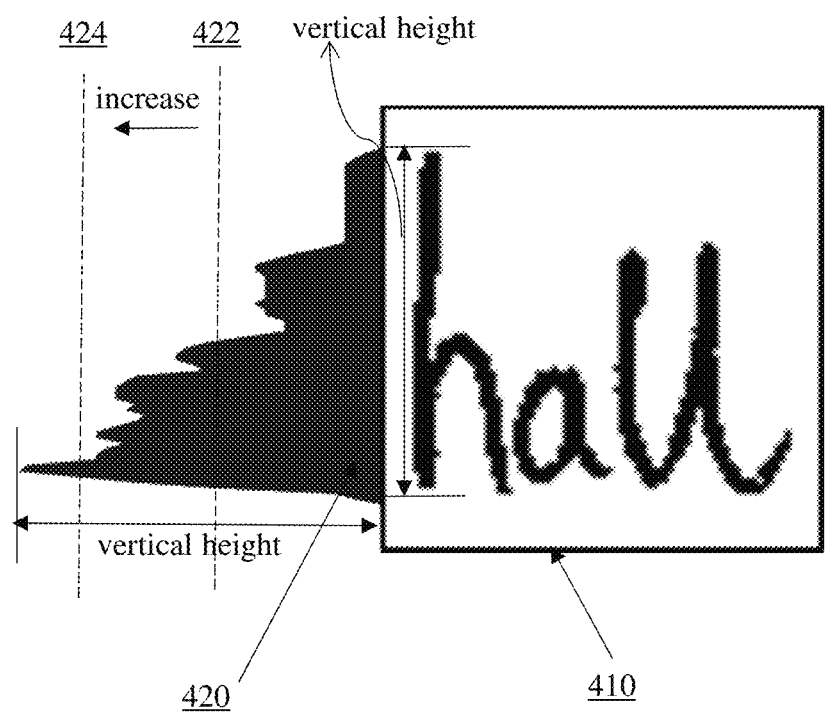

FIGS. 3 and 4A-B demonstrate how the normalization algorithm is applied in the recognizing stage to obtain a recognition result according to embodiments of the present invention. As shown in FIG. 3, starting at step S102, the system or computer for implementing the handwriting recognition program obtains a handwriting image, which can be any un-segmented handwriting data, including a word, a sentence, a paragraph or a chunk of texts. Such image can be obtained from a scanning machine, a touch screen or tablet or any device capable of receiving a handwriting input from a user. At step S104, the obtained image will go through some pre-processing, including, without limitation to, applying noise removal, gray scaling and binarization to the obtained image data. Typically, the noise removal step is to apply a blurring median filter with a window size of 5×5, for example, to the obtained image data in order to clean the data from random noises. Then, the filtered and cleaned data are converted into a gray scale format, usually referred as gray scaling, for further processing and manipulation. The filtered and gray-scaled data are binarized to result in black or white pixels. In practice, this can be done easily by using a data-driven threshold under the Otsu's algorithm. After the pre-processing steps, the image data will be normalized at step S106, which will be described herein below with references to FIGS. 4A-B.

As shown in FIG. 4A, the image height is normalized through the process of steps S202 to S208. First, at step S202, a vertical histogram is calculated for the pre-processed image, which, essentially, comprises a plurality of black or while pixels. As an example, FIG. 4B shows a pre-processed image of the handwritten word "Hall" 410 and its corresponding vertical histogram 420. The horizontal lengths or distances in the histogram 420 represent the vertical heights of the image 410. At step S204, the middle point of the histogram is detected, for example, the middle line 422 in FIG. 4B. Next, at step S206, by gradually increasing the distance from this middle point 422, as indicated by the arrow in FIG. 4B, a major component height 424 may be obtained when at least 95% of the foreground pixels (e.g., black pixels) are covered for normalization. In one embodiment, this major component height obtained from step S206 can be used as the normalized height for this particular image obtained at step S102. In other embodiments, this major component height (Hm) obtained from step S206 will be normalized to a fixed height (Hf), which can be a user-specified target height. Specifically, the ratio between the two heights is calculated, i.e., r=Hf/Hm, and this ratio is used to normalize the actual height of any image data or dataset. In that case, the height normalization is done through the following equation: Hn=H*r, where H represents the actual height of any given image and Hn is the normalized height of such image. In other words, the system or computer executing the normalization program can use the ratio of Hf/Hm to zoom in or out of the image (e.g., the handwritten word "Hall" in FIG. 4B), as indicated in step S208.

Back to FIG. 3, after the step S106 to normalize the image height as explained above, the normalization algorithm proceeds to step S108, where the normalized image, along with the determined height normalization setting, which will be described in detail later, is provided as input data to RNN (Recurrent Neural Network), which is a type of artificial neural network known in the art for machine learning purposes. At step S110, based on the input data, i.e., the normalized image and the height normalization setting, a recognition result is produced by RNN. Further, at step S112, such recognition result is outputted. If the computer or system for executing the normalization program determines to quit the recognition stage at step S114, the recognizing-stage routine as illustrated in FIG. 3 will return to the main routine in FIG. 2, which will end at this point. If the recognition stage is determined to continue at step S114, the recognizing-stage routine will resume from the beginning step of S102 to process another image input.

Figure 5:
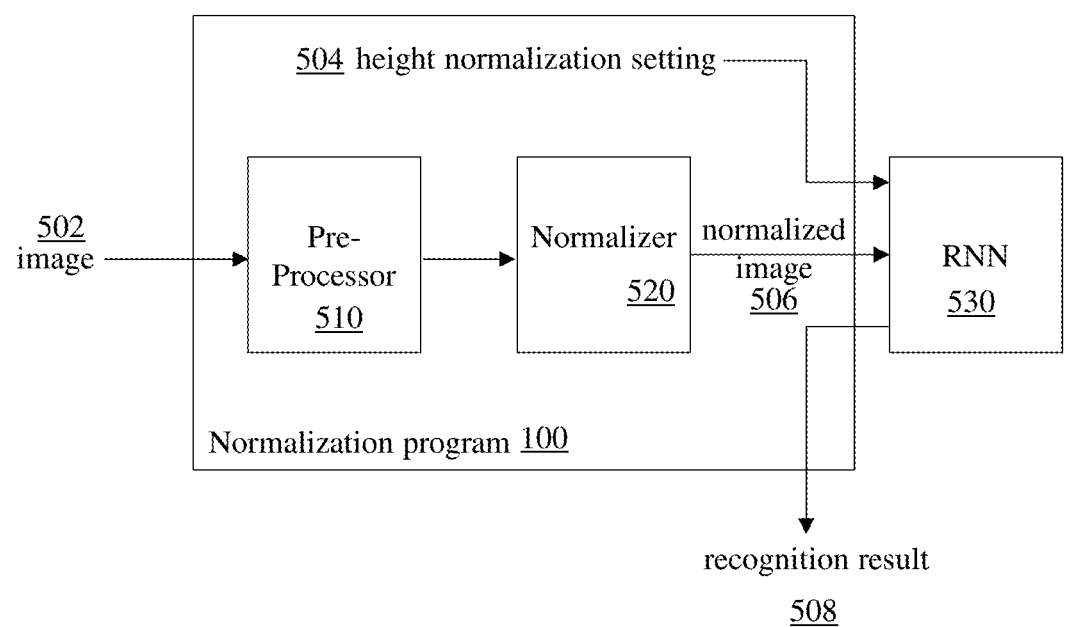
FIG. 5 is a block diagram illustrating exemplary components for implementing the normalization program in the recognizing stage according to embodiments of the present invention.

The above-described process or routine using the normalization algorithm for handwriting recognition can be implemented through the exemplary components in FIG. 5. As shown in FIG. 5, the normalization program 100 can be executed by such components as a pre-processor 510 and a nomalizer or normalizing module 520 connected to RNN 530. In operation, the image 502 is fed as input into the pre-processor 510, as indicated in step S102 of FIG. 3. The pre-processor 510 is configured to perform the pre-processing steps to the obtained image data and send the pre-processed image data to the normalizer 520 for normalization, which is done through a process as illustrated in FIG. 4A. Thereafter, the normalized image data 506 and the height normalization setting are provided to RNN 530 in order to obtain the recognition result 508. The height normalization setting is determined in the training stage where the normalization program is applied in a global scale, which will be described below with reference to FIGS. 6-10.

Figure 6:
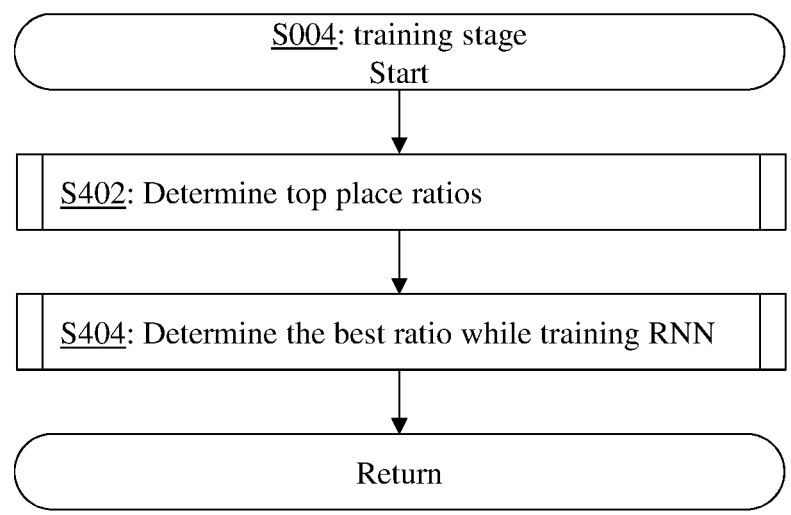
FIG. 6 is a flow diagram illustrating an exemplary application of the data normalization algorithm in the training stage of FIG. 2 according to embodiments of the present invention.

In the training stage, the normalization program is applied to training datasets in order to find a meaningful range of optimal ratios as candidates for normalization, and further identify the best ratio from these candidates, where the identified best ratio will be used in the height normalization setting for handwriting recognition. Therefore, as shown in FIG. 6, the training stage is comprised of two phrases: one is step S402 for determining a few top place ratios for normalization, and the other is step S404 for determining the best ratio out of the top place ratios while training RNN. Step S402 is further illustrated in FIGS. 7 and 8, while step S404 is further shown in FIGS. 9 and 10.

Figure 7:
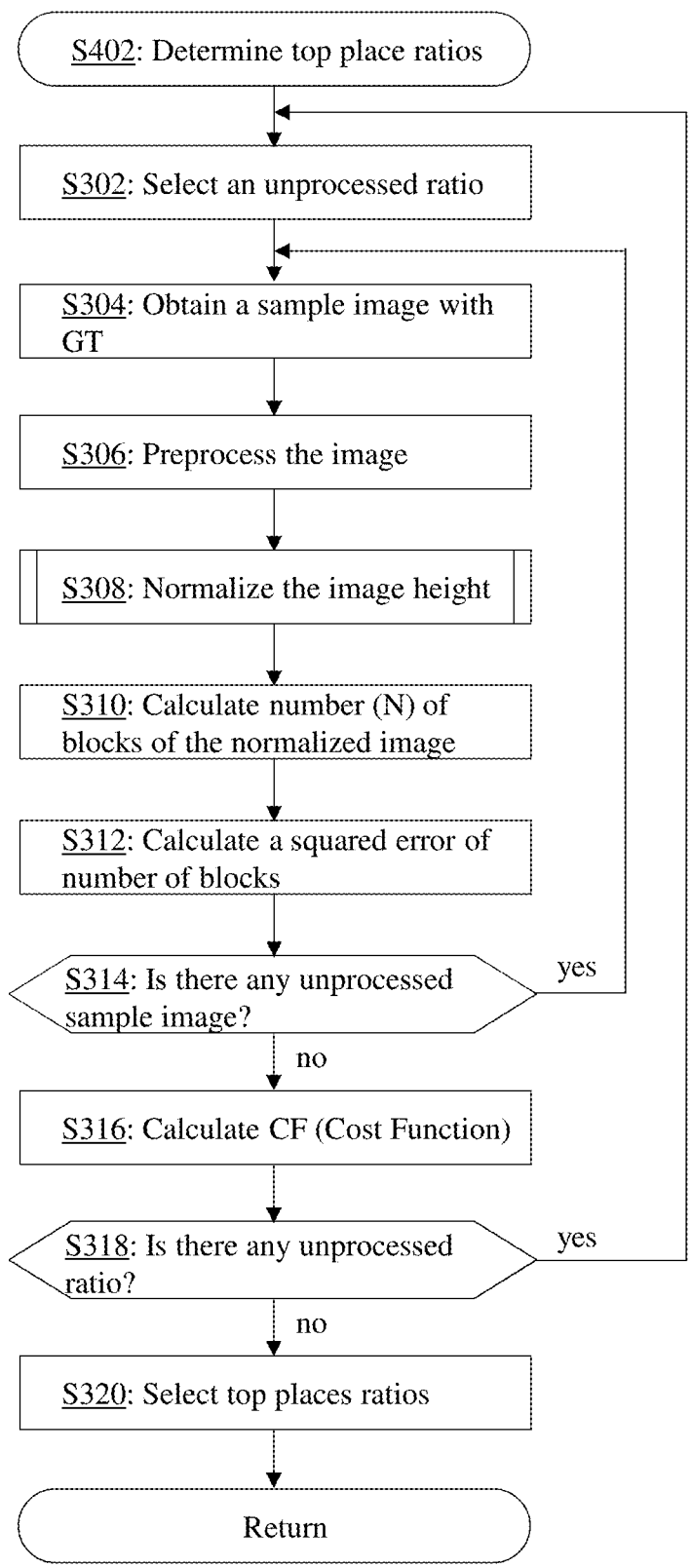
FIG. 7 is a flow diagram illustrating an exemplary process for determining top place ratios in the training stage according to embodiments of the present invention.
Figure 8:
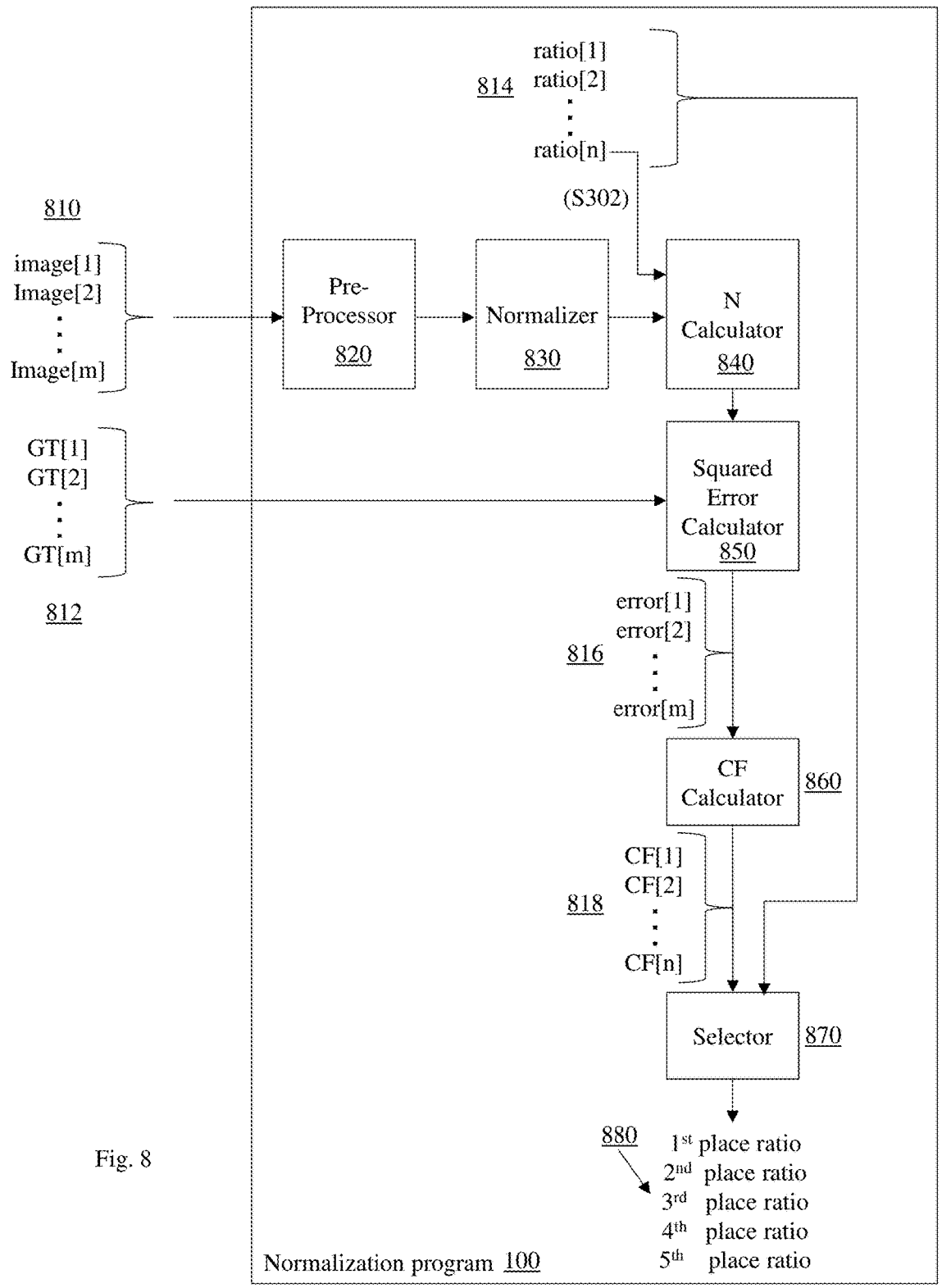
FIG. 8 is a block diagram illustrating exemplary components for implementing the exemplary process for determining top place ratios of FIG. 7 according to embodiments of the present invention.

Turning now to FIG. 7, provided therein is an exemplary process for determining top place ratios for normalization in the training stage according to embodiments of the present invention. As illustrated in FIG. 8, this process is repeated for processing or training a dataset comprising multiple sample images of handwriting data 810, each image having a GT (Ground Truth) 812, in order to select a small list of top place ratios (e.g., $1^{st}$ place to $5^{th}$ place ratios 880) from a large number of candidate ratios (e.g., ratio[1], ratio[2] ... ratio[n] 814). Examples of sample images and their corresponding GT are presented in FIGS. 11A-C.

Back to FIG. 7, the process for determining top place ratios starts at step S302, where an unprocessed ratio is selected. For example, as illustrated in FIG. 8, one of the ratios is selected from a number of ratios 814, namely, ratio[1], ratio[2] ... ratio[n]. Then, at step S304, a sample image with GT is obtained from a scanner or any user advice capable of receiving handwriting data. For example, the image "the" with GT in FIG. 11A can be such a sample image to be processed. At step S306, the obtained sample image is pre-processed in a way similar to the above-described pre-processing step of S104 in FIG. 3. In an actual implementation, this pre-processing step can be executed by the pre-processor 820 in FIG. 8. Next, the pre-processed image data goes through the normalization step of S308, which is similar to the above-described normalization routine in FIG. 4A. In practice, a normalizer or normalizing module, such as the normalizer 830 in FIG. 8, can be used for performing this step.

In one embodiment, the pre-processed and normalized sample image is rotated clockwise from horizontal to vertical orientation so as to facilitate the processing of sequence information in machine learning processes. Thereafter, as indicated in step S310, the computer or system executing the process, or more particularly, a block calculator, such as the N Calculator 840 in FIG. 8, is configured to calculate a number of blocks in the normalized image. As used herein, a "block" is defined according to the Connectionist Temporal Classification. Based on the height and width ratio of a character-level block, for example, one of the ratios selected from ratio[1], ratio[2] . . . ratio[n] of FIG. 8, the number of blocks in a given sample, which can be a word or a sentence, can be calculated using existing methods. In the meantime, a number of labels in the corresponding ground truth of the given sample can also be extracted. As a result, the previously unlabeled and un-segmented image data turns into a sequence of labeled data blocks. Next, at step of S312, a Squared Error is calculated for the number of blocks resulting from the above-described steps. In practice, this can be done through many existing Squared Error algorithms.

For further illustration purposes, examples in FIGS. 11B and 8 are used to explain the above-stated calculation steps. Assuming ratio[1] is selected as the unprocessed ratio at step S302, and the sample image "the" and its GT are obtained at step S304, the N Calculator 840 is configured to calculate a number of blocks based on the received ratio information and normalized image data at step S310. Further, at step S312, the Squared-Error Calculator 850 is configured to calculate a Squared Error for the number of blocks, which is $Error_{11}$ as shown in FIG. 11B.

Back to FIG. 7, if there is any unprocessed sample image as determined at step S314, the process will repeat from the beginning step of S304 to process the next sample image. For example, the next sample image "but" and its GT as shown in FIG. 11B may be obtained for normalization, and a squared error $Error_{12}$ is calculated accordingly. By the time all of the sample images in the dataset are processed with the selected ratio[1], a list of squared errors will be generated, i.e., $Error_{11}$, $Error_{12}$, . . . $Error_{25}$ as shown in FIG. 11B, which respectively correspond to the sample images in the dataset. At this point, the process of FIG. 7 proceeds to the next step of S316, where a CF (Cost Function) is calculated for each of the sample images in the dataset. In one embodiment, the CF calculator 860 in FIG. 8 is configured to calculate CF as follows:

$$CF(N(x, y), GT) = \frac{1}{2}\sum_{i=1}^{m}(N_i - GT_i)^2$$

where N is the number of blocks in a given sample, which is a function of x, y (aka, the width and height of a character-level block), i represents the number of sample images in the entire dataset, and $GT_i$ is the length of a ground truth corresponding to the $i^{th}$ sample. Given the goal to minimize the CF of each sample image in order to find the optimal ratio for that sample image, the following minimizing function is applied:

$$\text{Minimize}_{for\ x,y}\left[CF(N(x, y), GT) = \frac{1}{2}\sum_{i=1}^{m}(N_i - GT_i)^2\right]$$

Using the examples in FIG. 11B for illustration, after minimizing the cost function for each of the sample images in the dataset, a minimized CF result, such as CF[1], is generated. This result usually shows one or more of the sample images for which the selected ratio[1] is the optimal ratio.

Proceeding to step S318, the process determines whether there is any unprocessed ratio, and if so, another ratio, such as ratio[2] in FIG. 8, will be selected to repeat the steps of S304 to S316 for training the sample images of the dataset, after which another CF minimization result, e.g., CF[2], is generated for ratio[2]. After all of the ratios, e.g., ratio[1], ratio[2] . . . ratio[n], are processed, a list of minimized CF results are generated, such as CF[1], CF[2] . . . CF[n], each corresponding to an optimal ratio for at least one of the sample images in the dataset. For example, ratio[1] may be the optimal ratio for the sample images "the" and "hall," ratio[2] may be the optimal ratio for the sample images of "hall" "copy" and "allow," ratio [3] may be the optimal ratio for the sample image of "the," and so forth. In other words, each sample image may have a list of optimal ratios, for example, the sample image "the" may have ratio[1] and ratio[3], the sample image "hall" may have ratio[1] and ratio[2], and so forth. At step S320, the most repeated ratios are selected from these optimal ratios as the best candidate ratios. For example, the Selector 870 in FIG. 8 may be configured to select the top five (5) ratios as the candidate ratios for further processing and selection.

Figure 9:
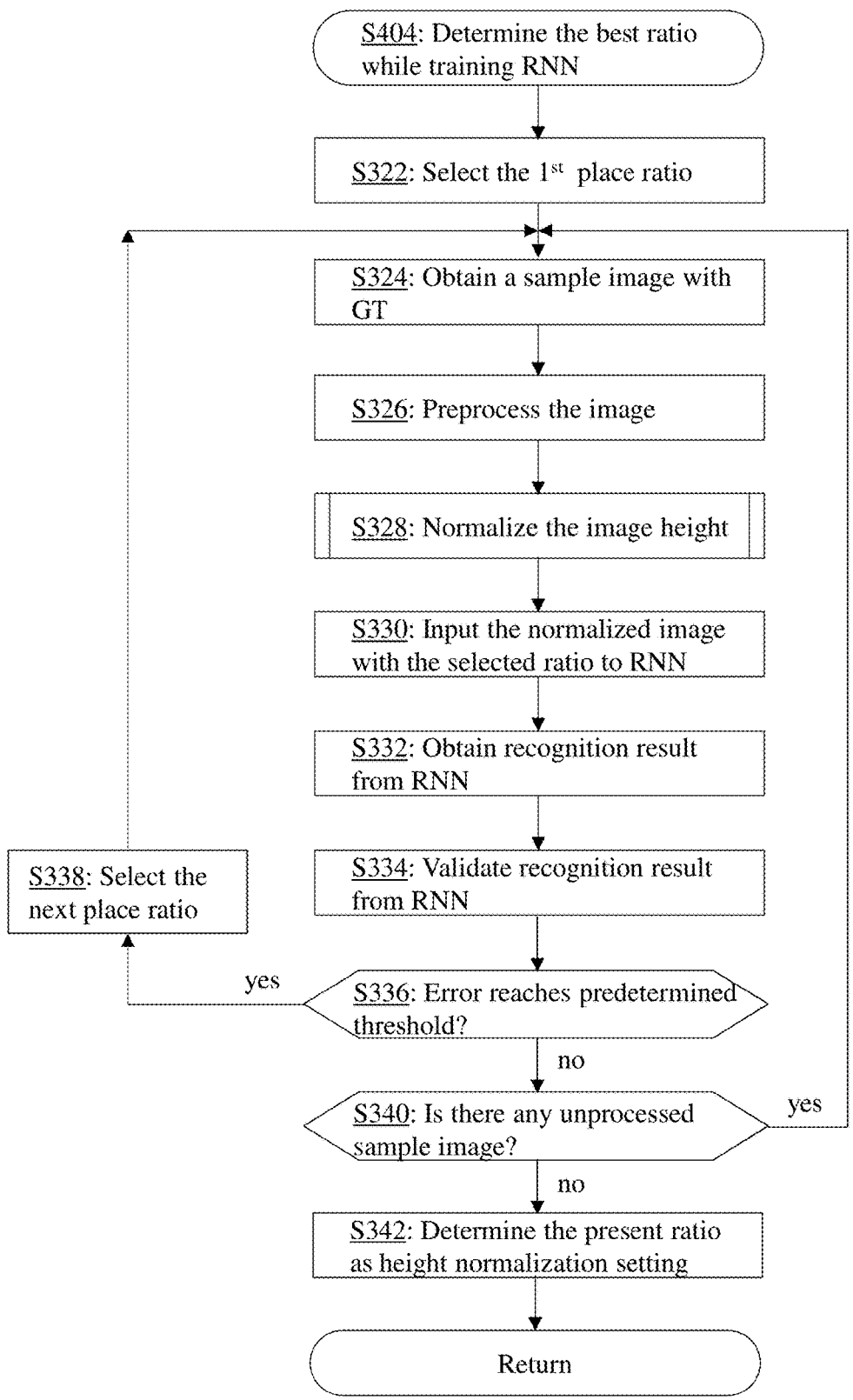
FIG. 9 is a flow diagram illustrating an exemplary process for determining the best ratio while training RNN (Recurrent Neural Network) in the training stage according to embodiments of the present invention.
Figure 10:
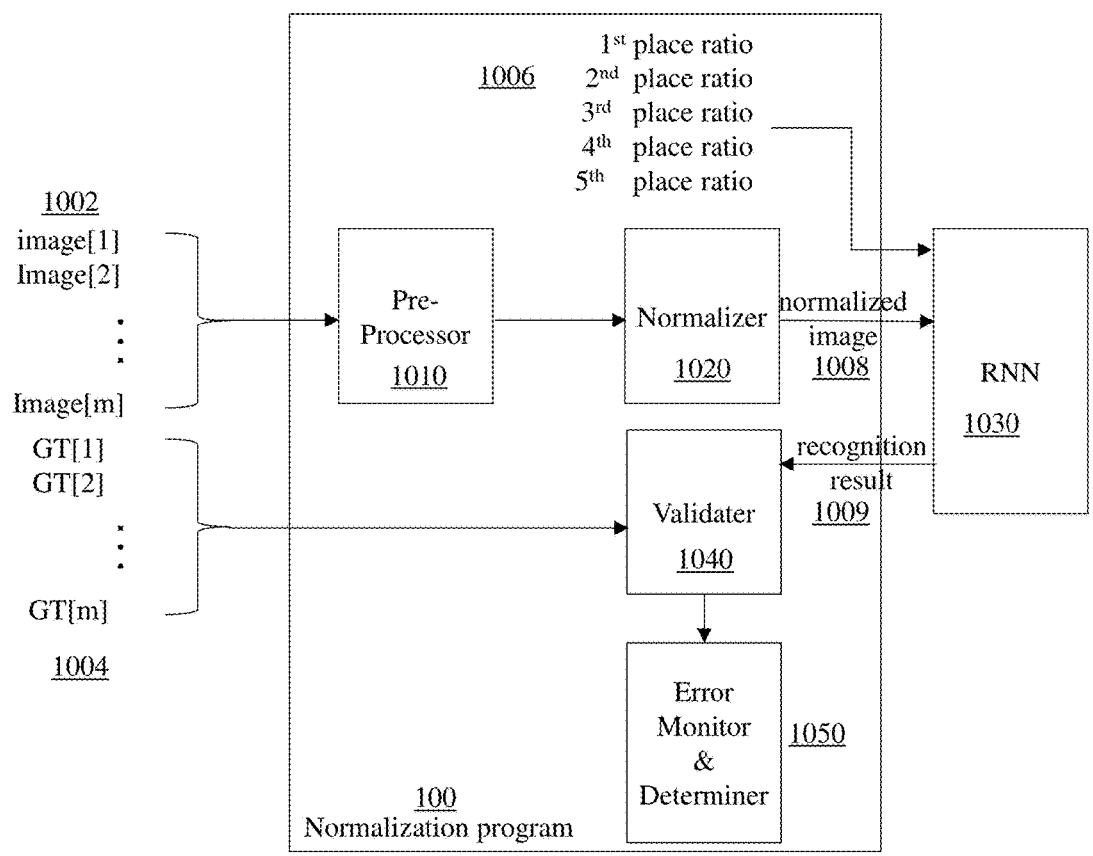
FIG. 10 is a block diagram illustrating exemplary components for implementing the exemplary process for determining the best ratio while training RNN of FIG. 9 according to embodiments of the present invention.

After the top place ratios are selected, the next step is to determine the best ratio, which can be done through the exemplary process in FIG. 9 in terms of the exemplary implementations in FIG. 10. Compared to the determination process in FIG. 7 as described above, the ratios to choose from in the determination process in FIG. 9 have been narrowed down to a few top place ratios, such as the $1^{st}$ to $5^{th}$ place ratios in FIG. 10. As will be described in detail below, this determination is made, again, through training the entire dataset (aka, multiple sample images) through RNN.

Turning to FIG. 9, the process for determining the best ratio starts at S322 where the $1^{st}$ place ratio is selected. Next, a sample image with GT is obtained at step S324, similar to the above-described steps S102 and S304. The obtained sample image will be pre-processed at the following step S326, similar to the above-described steps S104 and S306. In one embodiment, the pre-processor 1010 in FIG. 10 is configured to perform this step. After the sample image is pre-processed, it goes through the normalization step of S328, similar to the normalization routine in FIG. 4A. In operation, this step can be executed by the normalizer 1020 in FIG. 10. At step S330, the normalized image (e.g., the normalized image 1008) and the selected ratio (e.g., $1^{st}$ place ratio 1006) are provided as input data into the RNN 1030. Based on such data input, a recognition result is obtained from the RNN 1030 at step S332. This recognition result is validated at step S334. Specifically, as shown in FIG. 10, a validater or validation module 1040 is used to validate the recognition result against the GT of the sample image according to one embodiment of the invention. As a result of the validation step, an error representing the difference between the recognition result and the GT is generated. For instance, FIG. 11C shows an Error[1] that indicates the difference between the image "the" and its GT. At step S336, the process determines whether the error reaches a predetermined threshold, and if so, the selected ratio is probably not the best choice in view of the error rate. In that case, the process proceeds to step S338 to select the next place ratio and repeats the steps of S324 to S336 for the next place ratio. If the error rate is determined to fall below the threshold at step S336, then the process will repeat the determination for other sample images in the dataset. Thus, at step S340, the process determines whether there is any unprocessed sample image, and if so, the steps of S324 to S336 will be repeated for the next sample image until no more sample image is left in the dataset. Ultimately, the ratio that passes the validation and error check for each of the sample images in the dataset will be determined as part of the height normalization setting at step S342. As aforementioned, such determined height normalization setting will be used in the normalization algorithm for handwriting recognition, as illustrated in FIGS. 4A-B.

While various embodiments of the invention have been described above, it should be understood that they have been presented by way of example only, and not by way of limitation. Likewise, the various diagrams may depict an exemplary configuration for the disclosure, which is done to aid in understanding the features and functionality that can be included in the disclosure. Thus, the disclosure is not restricted to the illustrated exemplary configurations, but can be implemented using a variety of alternative configurations. It will be apparent to those skilled in the art that various modification and variations can be made in the above-described method and system of the present invention without departing from the spirit or scope of the invention. Thus, it is intended that the present invention cover modifications and variations that come within the scope of the appended claims and their equivalents.

What is claimed is:

1. A method of optimizing normalization for handwriting recognition, comprising:
    obtaining an image comprising handwriting data corresponding to at least one word;
    pre-processing the obtained image to produce a pre-processed image comprising multiple pixels;
    normalizing a height of the pre-processed image to generate a normalized image by:
        calculating a vertical histogram for the pre-processed image,
        detecting a middle height of the vertical histogram,
        increasing a major component height from the middle height until a pre-determined count of pixels out of the multiple pixels of the pre-processed image are covered,
        calculating a ratio between a pre-determined fixed height and the major component height, and
        zooming in or out of the pre-processed image at the calculated ratio to generate the normalized image;
    sending the normalized image and a normalization setting to RNN (Recurrent Neural Network); and
    obtaining a recognition result from the RNN for the normalized image based on the normalization setting.

2. The method of claim 1, wherein the step of pre-processing the obtained image comprises:
    removing noises from the obtained image to generate noise-filtered image data;
    gray scaling the noise-filtered image data to generated gray-scaled data; and
    binarizing the gray-scaled data to generate the multiple pixels of the pre-processed image.

3. The method of claim 1, wherein the normalization setting is determined by training the RNN with a dataset comprising multiple sample images of handwriting data.

4. The method of claim 3, wherein training the RNN with the dataset comprises:
    determining a plurality of candidate ratios for normalization, each candidate ratio representing an optimal ratio for at least one of the multiple sample images of the dataset; and
    selecting a ratio from the plurality candidate ratios, the selected ratio representing the best ratio for normalization based on a validation of recognition results for each sample image of the dataset.

5. The method of claim 4, wherein the step of determining the plurality of candidate ratios further comprises selecting the candidate ratios from a number of unprocessed ratios, each candidate ratio representing an optimal ratio for at least one sample image in the dataset.

6. The method of claim 5, wherein selecting the candidate ratios further comprises:
    selecting a first ratio from the unprocessed ratios;
    for each sample image in the dataset, performing a CF (Cost Function) minimization process based on the first ratio to identify a first number of sample images for which the first ratio is an optimal ratio;
    selecting a second ratio from the number of unprocessed ratios;
    for each sample image in the dataset, performing the CF (Cost Function) minimization process based on the second ratio to identify a second number of sample images for which the second ratio is an optimal ratio; and
    based on a comparison of the first and second numbers of sample images, determining one of the first and second ratios to be the candidate ratio.

7. The method of claim 6, wherein selecting the candidate ratios further comprises:
    selecting a third ratio from the unprocessed ratios;
    for each sample image in the dataset, performing the CF (Cost Function) minimization process based on the third ratio to identify a third number of sample images for which the third ratio is an optimal ratio; and
    based on a comparison of the first, second and third numbers of sample images, determining one or two of the first, second and third ratios to be the candidate ratio.

8. The method of claim 6, wherein the CF minimization process comprises:
    obtaining the sample image and its corresponding GT (Ground Truth);
    pre-processing the obtained sample image to generate a pre-processed sample image;
    normalizing a height of the pre-processed sample image to generate a normalized sample image;
    calculating a number of blocks for the normalized sample image, each block having a width and height of a selected ratio;
    calculating a squared error of the number of blocks; and
    calculating a CF (Cost Function) based on the number of blocks and GT of the sample image; and
    minimizing the CF for the dataset.

9. The method of claim 4, wherein the step of selecting the best ratio from the plurality candidate ratios comprises:
    selecting a first ratio from the plurality of candidate ratios;
    for each sample image of the dataset, performing a validation process comprising:
        obtaining the sample image and its corresponding GT (Ground Truth),
        pre-processing the obtained sample image to generate a pre-processed sample image,
        normalizing a height of the pre-processed sample image to generate a normalized sample image, inputting the normalized sample image and the selected first ratio to RNN to obtain a recognition result, validating the recognition result with the GT of the sample image to generate an error, and determining that the error falls below a pre-determined threshold; and determining the first ratio to be the best ratio.

10. A computer program product comprising a computer usable non-transitory medium having a computer readable program code embedded therein for controlling a data processing apparatus, the computer readable program code configured to cause the data processing apparatus to execute a process for optimizing data normalization for handwriting recognition, the process comprising:

obtaining an image comprising handwriting data corresponding to at least one word;

pre-processing the obtained image to produce a pre-processed image comprising multiple pixels;

normalizing a height of the pre-processed image to generate a normalized image by:

calculating a vertical histogram for the pre-processed image, detecting a middle height of the vertical histogram, increasing a major component height from the middle height until a pre-determined count of pixels out of the multiple pixels of the pre-processed image are covered, calculating a ratio between a pre-determined fixed height and the major component height, and zooming in or out of the pre-processed image at the calculated ratio to generate the normalized image;

sending the normalized image and a normalization setting to RNN (Recurrent Neural Network); and obtaining a recognition result from the RNN for the normalized image based on the normalization setting.

11. The computer program product of claim 10, wherein the step of pre-processing the obtained image comprises:

removing noises from the obtained image to generate noise-filtered image data;

gray scaling the noise-filtered image data to generated gray-scaled data; and binarizing the gray-scaled data to generate the multiple pixels of the pre-processed image.

12. The computer program product of claim 10, wherein the normalization setting is determined by training the RNN with a dataset comprising multiple sample images of handwriting data.

13. The computer program product of claim 12, wherein training the RNN with the dataset comprises:

determining a plurality of candidate ratios for normalization, each candidate ratio representing an optimal ratio for at least one of the multiple sample images of the dataset; and selecting a ratio from the plurality candidate ratios, the selected ratio representing the best ratio for normalization based on a validation of recognition results for each sample image of the dataset.

14. The computer program product of claim 13, wherein the step of determining the plurality of candidate ratios further comprises selecting the candidate ratios from a number of unprocessed ratios, each candidate ratio representing an optimal ratio for at least one sample image in the dataset.

15. The computer program product of claim 14, wherein selecting the candidate ratios further comprises:

selecting a first ratio from the unprocessed ratios;

for each sample image in the dataset, performing a CF (Cost Function) minimization process based on the first ratio to identify a first number of sample images for which the first ratio is an optimal ratio;

selecting a second ratio from the number of unprocessed ratios;

for each sample image in the dataset, performing the CF (Cost Function) minimization process based on the second ratio to identify a second number of sample images for which the second ratio is an optimal ratio; and based on a comparison of the first and second numbers of sample images, determining one of the first and second ratios to be the candidate ratio.

16. The computer program product of claim 15, wherein selecting the candidate ratios further comprises:

selecting a third ratio from the unprocessed ratios;

for each sample image in the dataset, performing the CF (Cost Function) minimization process based on the third ratio to identify a third number of sample images for which the third ratio is an optimal ratio; and based on a comparison of the first, second and third numbers of sample images, determining one or two of the first, second and third ratios to be the candidate ratio.

17. The computer program product of claim 16, wherein the CF minimization process comprises:

obtaining the sample image and its corresponding GT (Ground Truth);

pre-processing the obtained sample image to generate a pre-processed sample image;

normalizing a height of the pre-processed sample image to generate a normalized sample image;

calculating a number of blocks for the normalized sample image, each block having a width and height of a selected ratio;

calculating a squared error of the number of blocks; and calculating a CF (Cost Function) based on the number of blocks and GT of the sample image; and minimizing the CF for the dataset.

18. The computer program product of claim 13, wherein the step of selecting the best ratio from the plurality candidate ratios comprises:

selecting a first ratio from the plurality of candidate ratios;

for each sample image of the dataset, performing a validation process comprising:

obtaining the sample image and its corresponding GT (Ground Truth), pre-processing the obtained sample image to generate a pre-processed sample image, normalizing a height of the pre-processed sample image to generate a normalized sample image, inputting the normalized sample image and the selected first ratio to RNN to obtain a recognition result, validating the recognition result with the GT of the sample image to generate an error, and determining that the error falls below a pre-determined threshold; and determining the first ratio to be the best ratio.

19. An apparatus for optimizing normalization for handwriting recognition, comprising:

a processor configured for obtaining an image comprising handwriting data corresponding to at least one word;

a pre-processor configured for pre-processing the obtained image to produce a pre-processed image comprising multiple pixels; and a normalizer configured for normalizing a height of the pre-processed image to generate a normalized image by:
  calculating a vertical histogram for the pre-processed image,
  detecting a middle height of the vertical histogram,
  increasing a major component height from the middle height until a pre-determined count of pixels out of the multiple pixels of the pre-processed image are covered,
  calculating a ratio between a pre-determined fixed height and the major component height, and
  zooming in or out of the pre-processed image at the calculated ratio to generate the normalized image;
wherein the processor is further configured for sending the normalized image and a normalization setting to RNN (Recurrent Neural Network) and obtaining a recognition result from the RNN for the normalized image based on the normalization setting.

20. The apparatus of claim 19, wherein the pre-processor is further configured for:
  removing noises from the obtained image to generate noise-filtered image data;
  gray scaling the noise-filtered image data to generated gray-scaled data; and
  binarizing the gray-scaled data to generate the multiple pixels of the pre-processed image.

21. The apparatus of claim 19, wherein the normalization setting is determined by training the RNN with a dataset comprising multiple sample images of handwriting data.

22. The apparatus of claim 21, wherein the processor is further configured for training the RNN with the dataset by:
  determining a plurality of candidate ratios for normalization, each candidate ratio representing an optimal ratio for at least one of the multiple sample images of the dataset; and
  selecting a ratio from the plurality candidate ratios, the selected ratio representing the best ratio for normalization based on a validation of recognition results for each sample image of the dataset.

23. The apparatus of claim 22, wherein the processor is further configured for selecting the candidate ratios from a number of unprocessed ratios, each candidate ratio representing an optimal ratio for at least one sample image in the dataset.

24. The apparatus of claim 23, wherein the processor is further configured for selecting the candidate ratios by:
  selecting a first ratio from the unprocessed ratios;
  for each sample image in the dataset, performing a CF (Cost Function) minimization process based on the first ratio to identify a first number of sample images for which the first ratio is an optimal ratio;
  selecting a second ratio from the number of unprocessed ratios;
  for each sample image in the dataset, performing the CF (Cost Function) minimization process based on the second ratio to identify a second number of sample images for which the second ratio is an optimal ratio; and
  based on a comparison of the first and second numbers of sample images, determining one of the first and second ratios to be the candidate ratio.

25. The apparatus of claim 24, wherein the processor is further configured for selecting the candidate ratios by:
  selecting a third ratio from the unprocessed ratios;
  for each sample image in the dataset, performing the CF (Cost Function) minimization process based on the third ratio to identify a third number of sample images for which the third ratio is an optimal ratio; and
  based on a comparison of the first, second and third numbers of sample images, determining one or two of the first, second and third ratios to be the candidate ratio.

26. The apparatus of claim 25, wherein the CF minimization process is performed by:
  the processor obtaining the sample image and its corresponding GT (Ground Truth);
  the pre-processor pre-processing the obtained sample image to generate a pre-processed sample image;
  the normalizer normalizing a height of the pre-processed sample image to generate a normalized sample image;
  an N calculator calculating a number of blocks for the normalized sample image, each block having a width and height of a selected ratio;
  a squared error calculator calculating a squared error of the number of blocks; and
  a CF (Cost Function) calculator calculating a CF based on the number of blocks and GT of the sample image and minimizing the CF for the dataset.

27. The apparatus of claim 22, wherein the processor is further configure for selecting the best ratio from the plurality candidate ratios by:
  selecting a first ratio from the plurality of candidate ratios;
  for each sample image of the dataset, performing a validation process comprising:
    obtaining the sample image and its corresponding GT (Ground Truth),
    pre-processing the obtained sample image to generate a pre-processed sample image,
    normalizing a height of the pre-processed sample image to generate a normalized sample image,
    inputting the normalized sample image and the selected first ratio to RNN to obtain a recognition result,
    validating the recognition result with the GT of the sample image to generate an error, and
    determining that the error falls below a pre-determined threshold; and
  determining the first ratio to be the best ratio.

* * * * *